US012182830B2

United States Patent
Kim

(10) Patent No.: US 12,182,830 B2
(45) Date of Patent: Dec. 31, 2024

(54) METHOD, SYSTEM, AND NON-TRANSITORY COMPUTER-READABLE RECORDING MEDIA FOR SUPPORTING PAYMENT

(71) Applicant: BANK X INC., Seoul (KR)

(72) Inventor: Seung Hon Kim, Seoul (KR)

(73) Assignee: BANK X INC., Seoul (KR)

(*) Notice: Subject to any disclaimer, the term of this patent is extended or adjusted under 35 U.S.C. 154(b) by 0 days.

(21) Appl. No.: 18/025,549

(22) PCT Filed: Sep. 9, 2021

(86) PCT No.: PCT/KR2021/012302
§ 371 (c)(1),
(2) Date: Mar. 9, 2023

(87) PCT Pub. No.: WO2022/055280
PCT Pub. Date: Mar. 17, 2022

(65) Prior Publication Data
US 2023/0368232 A1    Nov. 16, 2023

(30) Foreign Application Priority Data

Sep. 9, 2020   (KR) .................. 10-2020-0115280
Nov. 25, 2020  (KR) .................. 10-2020-0160515

(51) Int. Cl.
*G06Q 30/0207*   (2023.01)
*G06Q 20/22*     (2012.01)

(52) U.S. Cl.
CPC ....... *G06Q 30/0207* (2013.01); *G06Q 20/227* (2013.01)

(58) Field of Classification Search
CPC .......... G06Q 30/0207; G06Q 20/227; G06Q 20/387; G06Q 30/06; G06Q 40/00;
(Continued)

(56) References Cited

U.S. PATENT DOCUMENTS 7,318,049 B2 * 1/2008 Iannacci ............... G06Q 20/10
                                                    705/41
10,417,556 B1 * 9/2019 Fairbank ................ G06N 3/08
(Continued)

FOREIGN PATENT DOCUMENTS

KR   10-10861390 B1   10/2008
KR   10-1719601 B1    3/2017
(Continued)

OTHER PUBLICATIONS

D. Manjo et al., "An Analysis of Q-Learning Algorithms with Strategies of Reward Function", International Journal on Computer Science and Engineering (IJCSE), vol. 3 No. Feb. 2, 2011, p. 814-820. (Year: 2011).*

(Continued)

*Primary Examiner* — Marie P Brady
(74) *Attorney, Agent, or Firm* — Sughrue Mion, PLLC

(57) ABSTRACT

A method for supporting payment is provided. The method includes the steps of: acquiring information on at least one payment means associated with a user and payment information of the at least one payment means; and determining a payment means to recommend to the user at the time of payment by referring to the result of learning performed using learning data including feature information extracted from the information on the at least one payment means and the payment information of the at least one payment means to maximize cumulative benefits according to the user's payment pattern.

17 Claims, 5 Drawing Sheets

Data Input
(a)

AI automatic recommendation service
(b)

Payment Method
(c)

(58) Field of Classification Search
CPC ...... G06Q 20/14; G06Q 20/16; G06Q 20/322; G06Q 20/326; G06Q 20/34; G06Q 30/0211; G06K 19/06; G06N 20/00; G06N 3/08
See application file for complete search history.

(56) References Cited

U.S. PATENT DOCUMENTS

| | | | |
|---|---|---|---|
| 2009/0099985 A1* | 4/2009 | Tesauro | G06N 5/02 706/12 |
| 2019/0228397 A1* | 7/2019 | Madden | G06N 3/044 |
| 2020/0234268 A1* | 7/2020 | Kohli | G06Q 20/405 |
| 2020/0302425 A1* | 9/2020 | Artemiw | G06Q 20/343 |
| 2021/0142352 A1* | 5/2021 | Woodrick | G06Q 20/405 |
| 2021/0398100 A1* | 12/2021 | Gabriele | G06Q 20/227 |
| 2022/0326664 A1* | 10/2022 | Kaberg Johard | G06N 3/006 |
| 2023/0368232 A1* | 11/2023 | Kim | G06Q 30/06 |

FOREIGN PATENT DOCUMENTS

| | | |
|---|---|---|
| KR | 10-1957347 B1 | 3/2019 |
| KR | 10-2048365 B1 | 11/2019 |
| KR | 10-2504309 B1 | 2/2023 |

OTHER PUBLICATIONS

E. Rummery, Gavin, Dissertation "Problem Solving with Reinforcement Learning) discusses different Q-learning algorithms", Cambridge University Engineering Department, Jul. 26, 1995, p. 1-107. (Year: 1995).*

International Search Report for PCT/KR2021/012302 dated Jan. 7, 2022.

* cited by examiner

Fig.4

| Ranking | Recommended by reinforcement learning | Sum of benefit | Recommended by similar user |
|---|---|---|---|
| 1 | A Card | B Card | C Card |
| 2 | B Card | A Card | D Card |
| 3 | C Card | C Card | B Card |
| 4 | D Card | D Card | A Card |
| 5 | E Card | E Card | E Card |

METHOD, SYSTEM, AND NON-TRANSITORY COMPUTER-READABLE RECORDING MEDIA FOR SUPPORTING PAYMENT

CROSS-REFERENCE OF RELATED APPLICATIONS AND PRIORITY

This Application is a national stage application of International Application No. PCT/KR2021/012302 filed on Sep. 9, 2021 which claims priority to Korean Patent Application Nos. 10-2020-0115280 filed Sep. 9, 2020 and 10-2020-0160515 filed Nov. 25, 2020.

TECHNICAL FIELD

The present invention relates to a method, system, and non-transitory computer-readable recording media for supporting payments.

BACKGROUND ART

As the number and types of payment methods (e.g., check cards, credit cards, etc.) increase, the types of benefits (e.g., discounts, point accumulation, etc.) provided for each payment method have also become diverse and complex. It has become difficult for users to know which payment method among their available ones will provide benefits, resulting in frequent situations where users have payment methods but do not receive proper benefits. Additionally, benefits provided for each payment method vary in frequency and limits, and prerequisite conditions such as previous month's usage are required to receive benefits. Therefore, it is difficult for users to determine which payment method is advantageous in the long term.

In order to address these issues, the present inventor proposes a novel and advanced technology that performs learning based on information on payment means associated with users and payment information of the payment means to determine payment means that maximize accumulated benefits according to the user's payment pattern and to recommend payment means to the user based on the results of the learning.

SUMMARY OF INVENTION

Technical Problem

The purpose of the present invention is to solve all of the aforementioned problems in the prior art.

Additionally, the present invention aims to recommend a payment method that can maximize accumulated benefits not only for a specific point (or situation) at which the user makes a payment based on the user's payment pattern, but also from a long-term perspective after that point.

Furthermore, the present invention aims to dynamically determine the optimal payment method to recommend to the user at the time of payment based on learning based on information about payment methods associated with the user and payment information for those payment methods.

SUMMARY OF THE INVENTION

A representative configuration of the present invention for achieving the above object is as follows.

According to one aspect of the present invention, a method for supporting payments includes acquiring information about at least one payment method associated with a user and payment information for the at least one payment method, performing learning using training data including feature information extracted from the acquired information about the at least one payment method and payment information to determine a payment method that maximizes accumulated benefits based on the user's payment patterns, and determining a payment method to recommend to the user at the time of payment based on the results of the learning.

According to another aspect of the present invention, a system for supporting payments includes an information acquisition unit for acquiring information about at least one payment method associated with a user and payment information for the at least one payment method, a learning management unit for performing learning using training data including feature information extracted from the acquired information about the at least one payment method and payment information to determine a payment method that maximizes accumulated benefits based on the user's payment patterns, and a recommendation management unit for determining a payment method to recommend to the user at the time of payment based on the results of the learning.

In addition, other methods, systems, and non-transitory computer-readable recording media for recording a computer program for executing the above method are provided for implementing the present invention.

According to the present invention, a payment method that can maximize accumulated benefits not only for a specific point (or situation) at which the user makes a payment based on the user's payment pattern but also from a long-term perspective after that point can be recommended to the user based on the user's payment pattern.

Furthermore, according to the present invention, the optimal payment method to recommend to the user at the time of payment based on learning based on information about payment methods associated with the user and payment information for those payment methods can be dynamically determined.

BRIEF DESCRIPTION OF DRAWINGS

FIGS. 3 and 4 are diagrams illustrating an exemplary process for supporting a user's payment according to an embodiment of the present invention.

DESCRIPTION OF REFERENCE CHARACTERS

Figure 1:
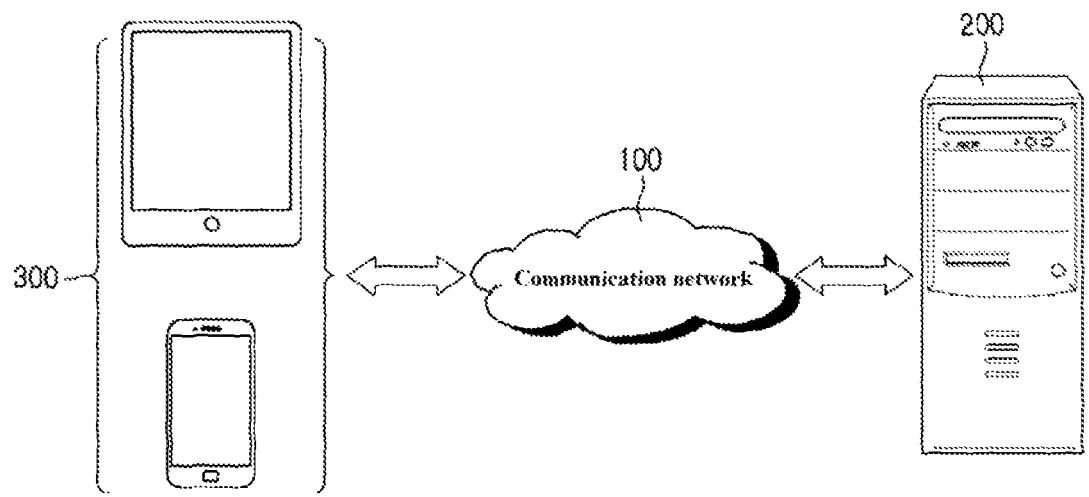
FIG. 1 is a diagram illustrating an overview of the entire system for supporting payments according to an embodiment of the present invention.

100: Communication network
200: Payment support system
210: Information acquisition unit
220: Learning management unit
230: Recommendation management unit
240: Communication unit
250: Control unit
300: User device

DETAILED DESCRIPTION OF EXEMPLARY EMBODIMENTS

The following detailed description of the present invention refers to attached drawings that illustrate specific embodiments of the invention as examples of implementation. These embodiments are described in detail sufficient for a person skilled in the art to practice the invention. Various embodiments of the present invention are not mutually exclusive, and specific shapes, structures, and characteristics disclosed in the specification can be changed and implemented in different embodiments of the invention as long as they do not depart from the spirit and scope of the invention. Additionally, the location or arrangement of individual components within each embodiment can also be changed without departing from the spirit and scope of the invention. Therefore, the following detailed description is not to be considered as limiting, and the scope of the invention should be construed to include the range of equivalents of the claims and all their equivalents. Similar reference numerals in the drawings represent identical or similar components throughout the various figures and embodiments.

In order to facilitate the practice of the present invention by those skilled in the art, various desirable embodiments of the invention are described in detail with reference to the accompanying drawings in the field of technology to which the present invention pertains.

Configuration of the Entire System

FIG. 1 is a diagram illustrating a schematic configuration of the entire system for supporting payment according to an embodiment of the present invention.

As shown in FIG. 1, the entire system according to an embodiment of the present invention may include a communication network (100), a payment support system (200), and a user device (300).

First, the communication network (100) according to an embodiment of the present invention can be configured regardless of the communication mode such as wired or wireless communication, and may be composed of various communication networks such as a LAN (Local Area Network), a MAN (Metropolitan Area Network), a WAN (Wide Area Network), etc. Preferably, the communication network (100) referred to in this specification can be the internet or the World Wide Web (WWW). However, the communication network (100) may include at least a portion of various data communication networks, telephone networks, or wireless television communication networks without being limited thereto.

For example, the communication network (100) may be a wireless data communication network, and may be implemented with at least a portion of conventional communication methods such as WiFi communication, WiFi-Direct communication, Long Term Evolution (LTE) communication, Bluetooth communication (such as Bluetooth Low Energy communication), infrared communication, ultrasound communication, etc. Another example is that the communication network (100) may be an optical communication network, and may be implemented with at least a portion of conventional communication methods such as LiFi (Light Fidelity) communication.

Next, the payment support system (200) according to an embodiment of the present invention can perform communication with the user device (300) to be described later via the communication network (100), acquire information about at least one payment means associated with the user and payment information about the at least one payment means, perform learning using training data including feature information extracted from the payment means-related information and the payment information to determine a payment means that maximizes cumulative benefits according to the user's payment pattern, and perform a function of determining a payment means to recommend to the user at the time of payment based on the result of the learning. This payment support system (200) may be a digital device equipped with memory means and a microprocessor capable of performing operations, and may be, for example, a server system operated on the communication network (100).

As described in embodiment 1, the entire system according to the present invention may include a communication network (100), a payment support system (200), and a user device (300). The user device (300) is a digital device equipped with memory and a microprocessor capable of communication after accessing the payment support system (200), including smart devices (smartphones, smartwatches, smart glasses, etc.), desktop computers, laptop computers, workstations, PDAs, web pads, mobile phones, etc. The user device (300) may be used as a device owned or possessed by the user to perform payment in online or offline stores according to the present invention.

In addition, according to an embodiment of the present invention, the user device (300) may include an application for supporting payment according to the present invention. Such an application may be downloaded from the payment support system (200) or an external application distribution server (not shown).

The configuration and functions of the payment support system (200) according to the present invention will be described in detail below. However, the description of the payment support system (200) is exemplary, and at least some of the required functions or components of the payment support system (200) may be implemented in the user device (300) or other external systems (not shown) depending on the need, which is obvious to those skilled in the art.

Configuration of Payment Support System

Hereinafter, the internal configuration of the payment support system (200) performing important functions for the implementation of the present invention and the functions of each component will be examined.

Figure 2:
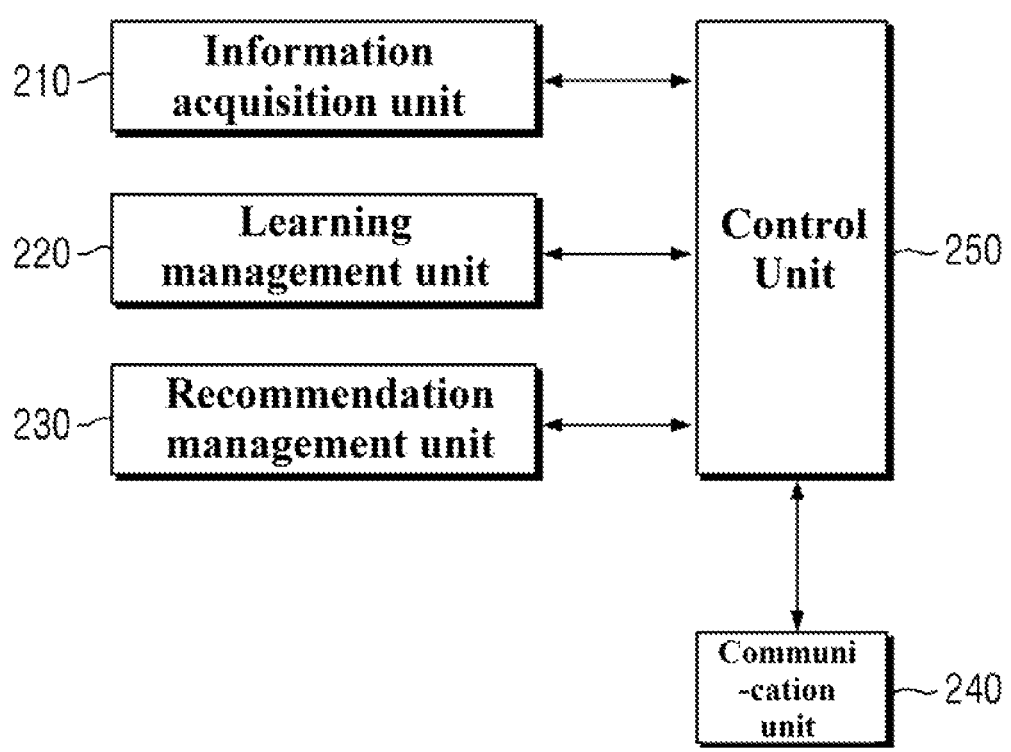
FIG. 2 is a diagram illustrating the internal configuration of the payment support system according to an embodiment of the present invention in detail.

FIG. 2 is a detailed diagram illustrating the internal configuration of the payment support system (200) according to an embodiment of the present invention.

As shown in FIG. 2, the payment support system (200) according to an embodiment of the present invention may include an information acquisition unit (210), a learning management unit (220), a recommendation management unit (230), a communication unit (240), and a control unit (250). According to an embodiment of the present invention, at least some of the information acquisition unit (210), the learning management unit (220), the recommendation management unit (230), the communication unit (240), and the control unit (250) may be program modules that communicate with external systems (e.g., user device (300), other external systems, etc.). Such program modules may be included in the payment support system (200) in the form of an operating system, application module, or other program module and may be physically stored in various known memory devices. In addition, such program modules may be stored in remote storage devices capable of communicating with the payment support system (200). The program modules may include routines, subroutines, programs, objects, components, data structures, or the like that perform specific tasks or operate on specific abstract data types, but are not limited thereto.

First, the information acquisition unit (210) according to an embodiment of the present invention may acquire information regarding at least one payment method associated with a user and payment information for the at least one payment method. The payment method according to an embodiment of the present invention may be a payment method that provides certain benefits such as discounts, savings, additional services, voucher provision, etc. and may include payment methods such as check cards, credit cards, app cards, mobile cards, mileage, points, gift certificates, etc. The information regarding the payment method according to an embodiment of the present invention may include information about the type of benefit provided by the payment method (e.g., promotion, affiliated brand discount, coupon, etc.), conditions for receiving benefits (e.g., performance in the previous month), benefit limits, installment rates, and the like. Additionally, payment information according to an embodiment of the present invention may include information regarding the payment method, payment time, payment location (e.g., name, industry, address, location, etc.), payment amount, and the like.

For example, the information acquisition unit (210) may acquire information regarding at least one payment method associated with a user and payment information for the at least one payment method by referencing at least one of the information acquired from the user device (300) and the information acquired from an external server (e.g., a server associated with a financial institution or card issuer) using, for example, Open API or web scraping technology.

Specifically, the information acquisition unit (210) according to an embodiment of the present invention can acquire information about at least one payment method associated with the user and payment information of the at least one payment method based on at least one of message information (e.g., payment history), email information, location information (e.g., GPS information), voice information, call information, and social network service (SNS) usage information of the user's device (300). In addition, the user's device (300) can be linked with at least one of the designated shootable objects (e.g., 1D or 2D barcodes, QR codes, text, etc.) and the designated contactless wireless communication means (e.g., wireless communication module using NFC, Bluetooth, etc.) installed in the payment store, and the information acquisition unit (210) can acquire information about at least one payment method associated with the user who pays at the payment store and payment information of the at least one payment method (e.g., location information of the payment store where the payment was made).

Furthermore, the information acquisition unit (210) can obtain various financial information in addition to information about at least one payment method and payment information of the at least one payment method based on at least one of the information acquired from the user's device (300) and the information acquired from an external server (e.g., a server associated with a financial company or a card company).

Next, the learning management unit (220) according to an embodiment of the present invention can perform learning using learning data that includes characteristic information extracted from at least one payment method and payment information of the at least one payment method to determine a payment method that maximizes cumulative benefits according to the user's payment pattern. The cumulative benefits according to an embodiment of the present invention can be specified based on a simple sum of the economic value that can be provided to the user or a weighted sum based on weights (or discount rates). Additionally, this learning can be performed based on an algorithm that utilizes artificial neural networks (e.g., deep learning), such as reinforcement neural network, convolutional neural network, recurrent neural network, deep Q-network, deep feed-forward network, generative adversarial network, and the like. However, the learning method according to the present invention is not limited to the above-mentioned learning methods, but can be variously applied within a range that achieves the purpose of the present invention.

For example, the learning management unit (220) can perform reinforcement learning based on the above-mentioned learning data to determine a payment method that maximizes cumulative benefits according to the user's payment patterns. Specifically, such reinforcement learning can be based on a Markov decision process that satisfies the Markov property, where the Markov property refers to the characteristic that the probability of the next state depends solely on the previous state. An agent of this Markov decision process can receive a state from the environment and determine an action probabilistically based on a policy. When the determined action is applied to the environment, the agent receives a reward along with the probability of transition (or transformation) to the next state, and reinforcement learning can be performed to find the optimal policy that maximizes the expected value of the sum of such rewards. Thus, the learning management unit (220) can extract feature information corresponding to the information acquired from the information acquisition unit (210), such as payment method name, payment date, payment amount, payment store, benefit limit, previous month's performance, and possession of membership, as well as higher-dimensional feature information determined by analyzing such one-dimensional information, such as satisfaction of previous month's performance, level of provided benefits, frequency of use of payment methods, number of visits to payment stores, number of visits to stores by type, preferred payment method, and preferred benefits. Based on such feature information, the learning management unit (220) can generate a value corresponding to the value of an action (e.g., such a value can be based on the total expected value of rewards corresponding to benefits that can be provided or are provided to the user, and specifically, can be determined based on a Q-function for producing an action-value or based on the Bellman equation, as necessary) for a state corresponding to the feature information, and can perform iterative learning through action selection and action-value updating processes that maximize such value (e.g., using Q-learning techniques, Monte-Carlo learning, or temporal difference learning). Moreover, the probability of taking a specific action or transitioning to another state in a specific environment or state during such reinforcement learning can be determined by referring to the user's payment patterns extracted from the information acquired from the information acquisition unit (210), such as preferred or frequent payment stores, payment amounts by time period, payment stores by time period, payment methods by time period, preferred or frequent payment methods, and preferred benefits (e.g., if the user has utilized a certain level or more of savings points for gasoline discounts or airline mileage, the user may have a high preference for gasoline or airline mileage). Additionally, such payment patterns can vary dynamically depending on each user or payment time (e.g., if the user moves from Seoul to Busan, the payment pattern may change). The discount factor for determining how valuable future rewards are in the present during such value determination can be dynamically determined based on each user's tendencies (such tendencies can be identified by analyzing the information acquired from the information acquisition unit (210)) or set to a certain value (e.g., a value between 0 and 1). Specifically, when the discount factor is set to a value between 0 and 1, the closer it is to 0, the greater the short-term value becomes, and the closer it is to 1, the greater the long-term value becomes.

Specifically, first, the learning management unit (220) can merge or select information obtained from the information acquisition unit (210) (for example, at least one payment method-related information associated with the user and payment information of the at least one payment method) in order to reduce the learning operation load (or reduce the amount of learning data) and extract feature information from it. In this case, weights (for example, if payment amount, usage frequency, and preference are the feature information, a weight can be calculated by adding up the scores for each feature information and dividing the sum by the total number of feature information, and then dividing each score by the denominator) or correlation coefficients (for example, values between 0 and 1) that can be set by the user (for example, based on user's tendencies) can be dynamically reflected in the feature information. The weights or correlation coefficients according to the present invention are not limited to the process of preparing learning data, but can also be applied to the process of determining recommended payment methods based on the reinforcement learning process or the results of the reinforcement learning. Next, the learning management unit (220) can perform grouping of the extracted feature information based on at least one technique of clustering, random forest, and factorization. Then, the learning management unit (220) can perform reinforcement learning based on the grouped information. Here, in order to find a policy that maximizes the cumulative benefits according to the user's payment pattern, Q-learning, policy gradient, Monte Carlo learning, temporal difference learning, and the like can be used, and to increase the stability of learning, actor-critic, dueling deep Q-network, and the like can also be used. Specifically, the learning management unit (220) can calculate the value of the action corresponding to the user using at least one payment method in a specific store based on the state determined based on the grouped information, and evaluate and update the policy that determines the above action based on Q-learning and epsilon-greedy technique. Through this iterative process, the optimal policy that maximizes the value calculated through the above action can be found.

As another example, the learning management unit (220) can train an artificial neural network-based learning model for determining a payment method that maximizes cumulative benefits according to the user's payment pattern using learning data including feature information extracted from information obtained from the information acquisition unit (210) (for example, at least one payment method-related information and payment information of the at least one payment method).

More specifically, the learning management unit (220) can use learning data that includes feature information extracted from information (such as information related to at least one payment method associated with the user and payment information of that at least one payment method) acquired from the information acquisition unit (210) to train an artificial neural network-based learning model consisting of an input layer, at least one hidden layer, and an output layer, to determine a payment method that maximizes accumulated benefits based on the user's payment pattern, by iteratively training the weights (such as synaptic or neural network weights) in the learning model. For example, these weights may be dynamically updated based on gradient descent to minimize a loss function and may be associated with the user's payment pattern (such as preferred or frequent payment stores, payment amounts by time of day, payment stores by time of day, payment methods by time of day, preferred or frequent payment methods, preferred benefits, etc.). Additionally, the accuracy of the learning model (specifically, the hidden and output layers) may be improved based on error backpropagation and activation functions (such as sigmoid or softmax functions).

In another example, the learning management unit (220) can train a first learning model that uses feature information related to the expected payment pattern output by the model from information (such as information related to at least one payment method and payment information of that at least one payment method) acquired from the information acquisition unit (210) as learning data, and a second learning model that uses feature information related to the payment method that maximizes accumulated benefits based on the user's payment pattern as learning data (or feature information extracted from information acquired from the information acquisition unit (210)). However, the learning models according to the present invention are not necessarily limited to being composed of multiple models as described above, and may be composed of a single learning model or three or more learning models within the scope of achieving the purpose of the present invention, considering the system's performance, load, etc.

Furthermore, the learning method according to the present invention is not necessarily limited to the specific learning methods enumerated above, and may be based on at least one learning method or a combination of learning methods, including supervised learning, unsupervised learning, and reinforcement learning, within the scope of achieving the purpose of the present invention.

Additionally, the learning method according to the present invention is not necessarily limited to the specific learning methods listed above, and can dynamically change to an optimal learning method based on neural architecture search algorithms and the like within the scope of achieving the purpose of the present invention.

Next, according to one embodiment of the present invention, the recommendation management unit (230) can determine a payment method to recommend to a user by referring to the results of learning performed by the learning management unit (220).

For example, the recommendation management unit (230) can determine a payment method to recommend as a payment method associated with an action that provides the maximum value or an action determined by the optimal policy corresponding to the use of payment methods based on reinforcement learning-based learning results. Specifically, the recommendation management unit (230) can identify information about payment methods held by the user and information about the store where the user will make the payment when the user makes a payment, and based on the reinforcement learning-based learning results for the user, can determine the payment method associated with the action that provides the maximum value among multiple actions of using multiple payment methods at the store and recommend it as the recommended payment method. In one embodiment of the present invention, information about the store where the user will make the payment can be obtained based on the location information of the user's device (300), or at least one of specific shooting possible objects (e.g., one-dimensional or two-dimensional barcodes, QR codes, text, etc.) installed at the payment store and a specific contactless wireless communication means (e.g., wireless communication module using NFC, Bluetooth, etc.) installed at the payment store and linked with the user's device (300).

Alternatively, the recommendation management unit (230) can determine a payment method to recommend as a payment method corresponding to the result output from an artificial neural network-based learning model trained by the learning management unit (220) among at least one payment method associated with the user. Specifically, when information about the payment methods held by the user and information about the store where the user will make the payment are used as input data, the recommendation management unit (230) can determine the payment method corresponding to the result output from the trained artificial neural network-based learning model as the recommended payment method.

Furthermore, the recommendation management unit (230) can also determine a payment method to recommend to a user by referring to the results of learning for other users associated with the user.

In addition, the learning method according to the present invention is not necessarily limited to the specific learning methods enumerated above, and can be dynamically changed to the optimal learning method based on neural architecture search algorithms within the range of achieving the purpose of the present invention.

Furthermore, the recommendation management unit (230) according to an embodiment of the present invention can perform the function of determining payment means to recommend to a user by referring to the results of the learning performed by the learning management unit (220).

For example, the recommendation management unit (230) can recommend payment means associated with an action that provides the maximum value among multiple actions corresponding to the use of payment means, determined by a reinforcement learning-based learning result or an optimal policy corresponding to the use of payment means, by referring to the learning result based on the reinforcement learning for the user and payment means information possessed by the user and information about the store where the payment is made. The information about the store where the payment is made can be obtained based on the location information of the user device (300) or at least one of the designated objects (such as one-dimensional or two-dimensional barcodes, QR codes, text, etc.) installed at the payment store and the designated wireless communication means (such as NFC, Bluetooth, etc.) installed at the payment store that are linked to the user device (300) according to an embodiment of the present invention.

In another example, the recommendation management unit (230) can determine a reference target user (or similar user) based on the personal information of a specific user, and recommend payment means corresponding to the output result of the learning model for the reference target user obtained by inputting information on the payment means possessed by the specific user and the store where the payment is made when the specific user makes a payment. Specifically, the recommendation management unit (230) can determine a reference target user (or similar user) with at least one of the same or similar gender, age, preferred payment means, and preferred store as the specific user.

Furthermore, the recommendation management unit (230) can provide notification information regarding the recommended payment means to the user when the recommended payment means is determined for the user.

For example, when the recommendation management unit (230) determines that B card is the recommended payment means among at least one of the payment means possessed by the user, the recommendation management unit (230) can provide notification information in the form of a voice message such as "Use B card. You can get a discount of 10,000 won out of an expected payment amount of 100,000 won, and you can also use 1,000 points and coupons." The expected payment amount calculated based on the payment pattern of the user or the learning result for the user can also be provided as notification information. The provision of notification information according to the present invention is not necessarily limited to the voice message method, but can be provided through various methods such as display, vibration, wearable devices (such as smart glasses, smart rings, etc.) within the range of achieving the purpose of the present invention.

Additionally, the recommendation management unit (230) can provide information on at least two recommended payment methods based on the results of learning about the user according to the payment timing of the user, the size of benefits provided by at least one payment method of the user, and the learning results of other users similar to the user (e.g., the sum of the economic value of discount amount, points, etc., of the payment method with the highest total value). In other words, by providing information on recommended payment methods in various ways, the diversity of payment method selection can be increased for the user.

Next, according to one embodiment of the present invention, the communication unit (240) can perform a function of enabling data transmission and reception from/to the information acquisition unit (210), the learning management unit (220), and the recommendation management unit (230).

Finally, according to one embodiment of the present invention, the control unit (250) can perform a function of controlling the flow of data among the information acquisition unit (210), the learning management unit (220), the recommendation management unit (230), and the communication unit (240). In other words, the control unit (250) according to the present invention can control the flow of data from/to the outside of the payment support system (200) or among each component of the payment support system (200) to control each unique function of the information acquisition unit (210), the learning management unit (220), the recommendation management unit (230), and the communication unit (240).

Figure 3:
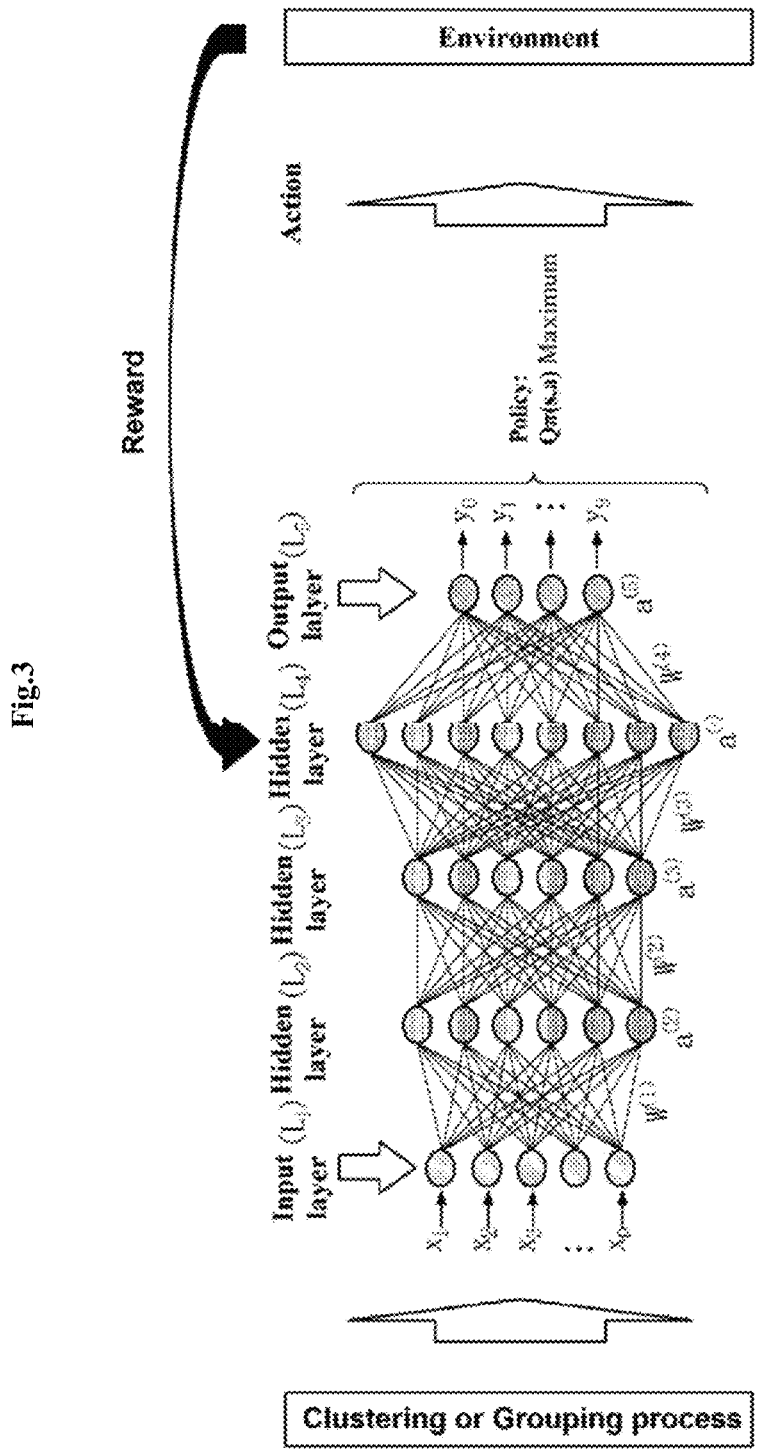

FIGS. 3 and 4 are diagrammatic illustrations showing a process of supporting the payment of user A through the payment support system (200) according to one embodiment of the present invention.

First, information on at least one payment method associated with user A and the payment information of the at least one payment method can be acquired from the device (300) being used by user A. For example, information on each of the 5 cards that user A possesses (i.e., A card, B card, C card, D card, E card), such as the name, type (e.g., check card, credit card), discount rate, point accumulation rate, cashback rate, coupon availability, required prior-month usage, and interest-free installment availability, can be acquired as payment method information associated with user A. Additionally, payment information such as payment date, payment location, and payment amount for each of the 5 cards can be acquired as payment information for each card.

Next, reinforcement learning based on an artificial neural network can be performed to determine the payment method that maximizes cumulative benefits for the user's payment pattern by using feature information extracted from the payment method information and payment information of the acquired payment methods. The learning algorithm for determining the payment method that maximizes cumulative benefits for the user's payment pattern according to the present invention is not limited to the reinforcement learning based on the artificial neural network, but can also be performed by a combination of at least two or more of supervised learning, unsupervised learning, and reinforcement learning based on the artificial neural network.

For example, in reinforcement learning, the state can be denoted as S, the action as A, the policy as 7r, the reward as R, the value as V, and the Q function as Q. Referring to FIG. 3, according to an embodiment of the present invention, information on the payment means and payment information of the payment means can be merged or selected, and feature information can be extracted from them. The feature information may include one-dimensional information such as the name of the payment means, payment date and time, payment amount, payment store, benefit limit, previous month's performance, and membership status, as well as higher-dimensional information such as previous month's performance satisfaction, degree of provided benefit, usage frequency of each payment means, visit frequency by store, visit frequency by store type, preferred payment means, and preferred benefit analyzed from the one-dimensional information. Then, according to an embodiment of the present invention, grouping of the above feature information can be performed based on at least one technique such as clustering, random forest, and factorization. Next, according to an embodiment of the present invention, by using the grouped information as a state (S) corresponding to the grouped information (where the reward at each state can be represented as $E[R_{t+1}|S_t=s]$ and the total sum of current or future rewards, denoted as $G_t$, can be represented as $R_{t+1}+\gamma*R_{t+2}+\gamma^2*R_{t+3}+ \ldots +\Sigma\gamma^{k}*R_{t+k}$ (where k can be 0 to $\infty$ and the discount rate $\gamma$ can be between 0 and 1)) that corresponds to a user using at least one payment means at a specific store, the value of the action (e.g., $V(s)=E(G_t|S_t=s)=E[R_{t+1}+\gamma*V(S_{t+1}|S_t=s])$ is calculated, and the learning can be performed by repeating the process of finding the optimal policy that maximizes the value of $Q\pi(s,a)$ (specifically, $E_\pi[G_t|S_t=S, A_t=a]$) based on the Q learning technique. For example, the value of Q for a specific state-action pair (Q(s,a)) can be updated by repeatedly adding the received reward for that state-action pair (e.g., R(s,a)) and the maximum Q value-discount rate (i.e., $\gamma maxa'Q(s',a')$) in an adjacent state, in order to find the optimal policy that maximizes the value (or cumulative benefit). Furthermore, it should be noted that the learning method according to the present invention is not necessarily limited to the Q learning technique mentioned above, and techniques such as Monte-Carlo learning and temporal difference learning can also be used within the scope of achieving the purpose of the present invention.

Next, based on the results of the learning process described above, a recommended payment method for user A can be determined at the time of payment for user A by referring to the learned information.

For example, at the time of payment, information about the payment methods possessed by user A and information about the store where the payment will be made can be determined. Based on the results of the learning process, Q-values (e.g. $Q\pi(s,a)$) can be calculated for each of the five cards that user A possesses, with each Q-value corresponding to a specific state (s) at the time of payment. The card with the highest Q-value can be recommended as the payment method.

Alternatively, at the time of payment, information about the payment methods possessed by user A and information about the store where the payment will be made can be determined. Based on the results of the learning process, Q-values (e.g. $Q\pi(s,a)$) can be calculated for each possible combination of the five cards that user A possesses, with each Q-value corresponding to a specific state (s) at the time of payment. The combination of cards with the highest Q-value can be recommended as the payment method.

Referring to FIG. 4, a recommended payment card for user A can be determined using an artificial neural network (e.g. deep learning) based on reinforcement learning (or supervised or unsupervised learning) at the time of payment for user A. The size of benefits provided by the five cards possessed by user A can also be used as a basis for recommending a payment method. Recommendation information for the payment method can be provided to user A in the form of a ranking based on factors such as the size of available benefits, as well as the results of learning for users similar to user A.

The following figure provides an illustrative example of another process for supporting the payment of user B through a payment support system (200) according to an embodiment of the present invention.

First, through an application (which can be installed on a device (300) used by user B) connected to the payment support system (200) according to the present invention and a communication network (100), user B's membership registration can be performed. Through this membership registration process, user B's personal information (e.g., name, resident registration number, phone number, etc.), information regarding user B's payment methods, and user B's financial asset information (e.g., status of securities, insurance, loans, membership cards or points, coupons, etc.) can be acquired. For example, the above information can be provided to the device (300) used by user B through OPEN API technology with user B's consent to provide personal information.

Next, based on user B's personal information, information regarding user B's payment methods, and user B's financial asset information, information regarding at least one payment method associated with user B and payment information for that at least one payment method can be obtained.

Next, learning can be performed using training data that includes feature information extracted from the at least one payment method information and payment information obtained above, to determine a payment method that maximizes cumulative benefits according to user's payment patterns. Here, information on user B's payment method usage patterns identified on the device (300) used by user B can also be used as training data.

For example, information on user B's payment method usage patterns can be identified from the usage history of payment applications (such as Samsung Pay, Shinhan Pay, Kakao Pay, etc.) that guide payment through recommended payment methods or combinations selected by user B on the device (300) used by user B, and can be used as training data together with the above information regarding at least one payment method and payment information.

First, user B's membership registration can be made through an application (which can be installed on the device 300 that user B is using) that is integrated with the payment support system (200) of the present invention and the communication network (100). Through this membership registration process, personal information of user B (such as name, resident registration number, phone number, etc.), information about user B's payment methods, and information about user B's financial assets (such as securities, insurance, loans, membership cards or points, coupons, etc.) can be acquired. For example, the above information can be provided to the device 300 that user B is using based on OPEN API technology with the user B's consent to provide personal information.

Then, when user B enters a specific store, information about that store can be obtained. According to one embodiment of the present invention, such store information can be obtained based on the manner in which the user B is using the device 300, such as through direct input by user B, through voice input by user B, based on GPS coordinates of the device 300 that user B is using, or through a store information providing module (such as barcode, QR code, Bluetooth, NFC, RFID, MST, POS terminal, etc.) that can be connected to the device 300 that user B is using. However, it is not limited to the above methods and may be changed in various ways using IoT (Internet of Things) technology.

Then, based on the result of the above learning, a recommended payment method for user B can be determined at the time of payment. For example, when information about user B's payment methods and the store where user B will make a payment are used as input data, the payment method corresponding to the output result of the learned neural network-based model can be determined as the recommended payment method. The information about coupons, events, promotions, etc. offered by the store where user B will make a payment can be included in the information about the store where user B will make a payment. In addition, the recommended payment method can be determined by referring to the payment methods available for payment at the store where user B will make a payment.

Meanwhile, based on the result of the above learning, a payment method that can maximize the accumulated benefits according to user B's payment pattern can be determined as the recommended payment method, even if user B does not currently have the payment method. That is, if there is a payment method (such as credit card, debit card, membership card, etc.) that can maximize user B's accumulated benefits from a long-term perspective, even if user B does not currently have the payment method, that payment method can be determined as the recommended payment method. Furthermore, the recommended payment method can be determined by additionally referring to the usage pattern of the application installed on the device 300 that user B is using. For example, if user B prefers voice recognition as the authentication method, a payment method that supports that authentication method or a payment method that supports a similar authentication method can be determined as the recommended payment method.

Hereinafter, an example of the difference in benefits that can be provided to the user when payment is supported according to the present invention will be examined.

For example, assume that user B possesses two payment means, A card and B card, and that for A card, a 30% discount on movie tickets without a limit on the number of uses is provided when achieving a certain previous month's record, while for B card, a 5,000 won (or half-price) discount on movie tickets is provided three times a year without any requirements on previous month's record. If at the time of payment by user B, the previous month's record for A card is not achieved, in the short term, B card may be recommended as the payment means with the greatest discount benefit. However, if the learning according to the present invention is performed, a payment pattern in which user B's movie viewing or movie ticket payment exceeds the specified number of times (or user B's movie viewing will continue for at least six months) can be considered, and accordingly, A card can be recommended as the payment means to maximize the cumulative benefits in the long term by increasing the performance of A card. For example, through reinforcement learning according to the present invention, a payment means that maximizes the sum of future rewards (e.g., value) rather than the current reward can be selected as the recommended payment means.

Figure 5:
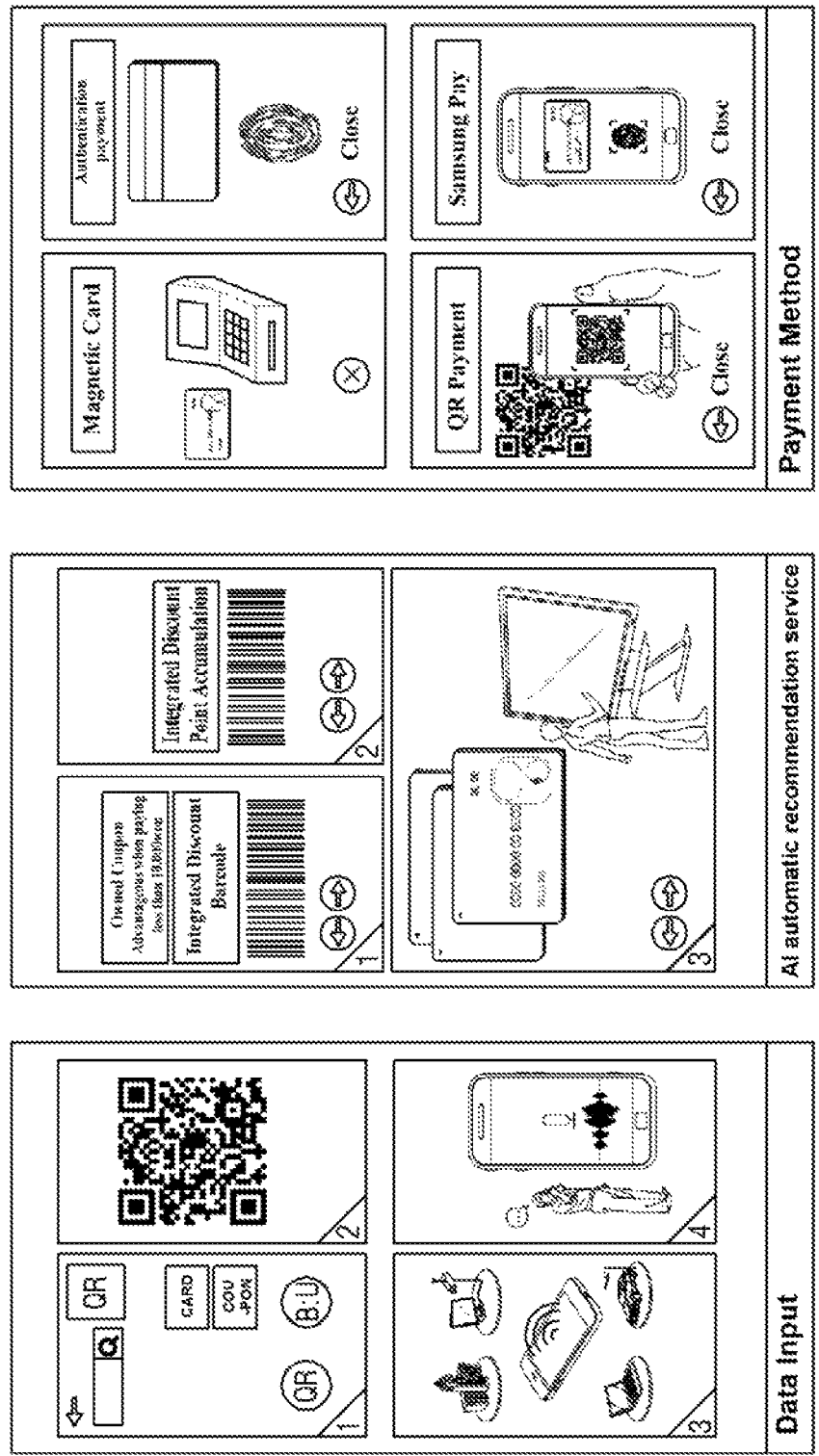
FIG. 5 is a diagram illustrating an exemplary user interface screen that can be provided to a user through the payment support system according to an embodiment of the present invention.

FIG. 5 is an exemplary drawing showing a user interface screen that can be provided to the user through the payment support system (200) according to an embodiment of the present invention.

Referring to (a) of FIG. 5, information related to the user's personal information (e.g., name, date of birth, resident registration number, phone number, height, weight, gender, etc.), possessed payment means, connection with financial institutions, credit card companies, securities companies, etc., can be input through the user interface screen provided to the user device (300) according to an embodiment of the present invention. Based on the information obtained through the user interface screen, information related to at least one payment means associated with the user and its payment information, as well as information related to the store where the user's payment is made, can be obtained. The information in the user interface screen can be directly entered by the user or obtained through voice recognition, barcode, QR code, or wireless communication with other devices (e.g., IoT, WiFi, etc.).

Referring to (b) of FIG. 5, in one embodiment of the present invention, multiple recommended payment methods or combinations of such methods can be provided to the user in the form of a pop-up screen at the time of payment, and a user interface screen can be provided to allow the user to select the recommended payment method or combination. In addition, an integrated barcode or QR code for membership discounts, coupon discounts, point accumulation, or other benefits associated with the selected payment method or combination can be provided on the user interface screen.

Referring to (c) of FIG. 5, a user interface screen can be provided to guide the user in making a payment using the selected recommended payment method or combination. In this case, an application associated with the recommended payment method or combination (such as Samsung Pay, Shinhan Pay, Kakao Pay, etc.) can be activated and provided together.

The above-described embodiments of the present invention may be implemented in the form of program instructions executable by various computer components and may be recorded on a computer-readable recording media. The computer-readable recording media may include program instructions, data files, data structures, or a combination thereof. The program instructions recorded on the computer-readable recording media may be specially designed and configured for the present invention, or may be available to those skilled in the computer software field. Examples of computer-readable recording media include magnetic media such as hard disks, floppy disks, and magnetic tapes, optical recording media such as CD-ROMs and DVDs, magneto-optical media such as floptical disks, and hardware devices specially designed to store and execute program instructions such as ROM, RAM, and flash memory. Examples of program instructions include machine code generated by a compiler and high-level language code that can be executed by a computer using an interpreter or the like. The hardware device can be modified by one or more software modules to perform the processing according to the present invention, and the reverse is also true.

Although the present invention has been described with specific components, limited embodiments, and drawings, such description is provided to aid in the understanding of the invention and should not be construed as limiting the invention. Those skilled in the art of the invention can make various modifications and changes from the disclosure herein using common knowledge in the relevant technical field.

What is claimed is:

1. A method for supporting payment, comprising:
   acquiring information on at least one payment means associated with a user and payment information of the at least one payment means;
   determining, using an artificial neural network based learning model and using reinforcement learning, a policy that maximizes a value of an action corresponding to a use of the at least one payment means by the user based on a state corresponding to feature information;
   training the learning model using learning data including the feature information extracted from the information on the at least one payment means and the payment information of the at least one payment means by maximizing cumulative benefits according to a payment pattern of the user and by maximizing the value of the action corresponding to the use of the at least one payment means by the user based on to the state corresponding to the feature information, the value of the action being determined based on an expected value of a sum of a current reward and a future reward corresponding to the cumulative benefits according to the payment pattern of the user,
      wherein the reinforcement learning is based on Q-learning for determining the policy that maximizes the value;
   updating, using the Q-learning, a value of Q for a specific state-action pair by repeatedly adding a reward received for the specific state-action pair and (a maximum Q value)×(a discount rate) in an adjacent state, to determine the policy that maximizes the value of the action, the discount rate indicating a size of a benefit in a long-term perspective;
   determining a payment means to recommend to the user at a time of payment based on the determined policy that maximizes the value of the action, the trained learning model, and the updated value of Q; and
   providing notification of the recommended payment means to the user.

2. The method according to claim 1, wherein neural network weights in the learning model are dynamically updated based on gradient descent, and the neural network weights are associated with the payment pattern of the user.

3. The method according to claim 1, wherein the feature information is related to the payment pattern of the user.

4. The method according to claim 1, comprising learning using a deep learning-based learning algorithm including an input layer, multiple hidden layers, and an output layer.

5. The method according to claim 1, wherein a result of learning for other users associated with the user are further referred to in determining to the payment means to recommend to the user.

6. The method according to claim 1, wherein, in determining the payment means, a payment means with a maximum value among the at least one payment means whose value corresponds to a result of the learning is recommended to the user at the time of payment according to the payment pattern of the user.

7. The method according to claim 1, wherein the determining the payment means includes determining two or more payment means to recommend to the user, and
   wherein, in determining the two or more payment means, information on the two or more payment means is provided as recommendation information, which is determined based on a result of learning for the user, a size of a benefit provided by each of the at least one payment means, and a result of learning for other users similar to the user.

8. A non-transitory computer-readable recording media on which a computer program for executing the method according to claim 1 is recorded.

9. The method according to claim 1, wherein the discount rate is dynamically determined based on tendencies of the user, which are identified by analyzing the information on the at least one payment means and the payment information of the at least one payment means.

10. A system for supporting payment, comprising:
    a memory configured to store computer program; and
    a processor configured to execute the computer program to perform:
    acquiring information about at least one payment means associated with a user and payment information of the at least one payment means;
    determining, using an artificial neural network based learning model and using reinforcement learning, a policy that maximizes a value of an action corresponding to a use of the at least one payment means by the user based on a state corresponding to feature information;
    training the learning model using learning data including the feature information extracted from the information about the at least one payment means and the payment information to determine a payment means by maximizing that maximizes cumulative benefits according to a payment pattern of the user and by maximizing the value of the action corresponding to the use of the at least one payment means by the user based on the state corresponding to the feature information, the value of the action being determined based on an expected value of a sum of a current reward and a future reward corresponding to the cumulative benefits according to the payment pattern of the user,
       wherein the reinforcement learning is based on Q-learning for determining the policy that maximizes the value;
    updating, using the Q-learning, a value of Q for a specific state-action pair by repeatedly adding a reward received for the specific state-action pair and (a maximum Q value)×(a discount rate) in an adjacent state, to determine the policy that maximizes the value of the action, the discount rate indicating a size of a benefit in a long-term perspective;
    determining a payment means to recommend to the user at a time of payment based on the determined policy that maximizes the value of the action, the trained learning model, and the updated value of Q; and
    providing notification of the recommended payment means to the user.

11. The system of claim 10, wherein neural network weights in the learning model are dynamically updated based on gradient descent, and the neural network weights are associated with the payment pattern of the user.

12. The system of claim 10, wherein the feature information is related to the payment pattern of the user.

13. The system of claim 10, wherein the processor is configured to execute the computer program to perform learning using a deep learning-based learning algorithm including an input layer, multiple hidden layers, and an output layer to perform the learning.

14. The system of claim 10, wherein the processor is configured to execute the computer program to determine to the payment means to recommend to the user by referring to a result of learning about other users associated with the user.

15. The system of claim 10, wherein the processor is configured to execute the computer program to determine to the payment means to recommend to the user at the time of payment by recommending a payment means among the at least one payment means that maximizes the value.

16. The system of claim 10, wherein the determining the payment means includes determining two or more payment means to recommend to the user, and wherein the processor is configured to execute the computer program to provide information about the two or more payment means, including the recommended payment means based on a result of learning about the user and a size of a benefit provided by each of the at least one payment means and the recommended payment means based on a result of learning about other users who are similar to the user at or above a certain level.

17. The system according to claim 10, wherein the discount rate is dynamically determined based on tendencies of the user, which are identified by analyzing the information on the at least one payment means and the payment information of the at least one payment means.

* * * * *